(12) United States Patent
Haari et al.

(10) Patent No.: US 10,808,191 B2
(45) Date of Patent: Oct. 20, 2020

(54) GASIFICATION APPARATUS, CONTROL DEVICE, INTEGRATED GASIFICATION COMBINED CYCLE, AND CONTROL METHOD

(71) Applicant: MITSUBISHI HITACHI POWER SYSTEMS, LTD., Yokohama-shi, Kanagawa (JP)

(72) Inventors: Kenta Haari, Kanagawa (JP); Yasunari Shibata, Kanagawa (JP); Yasuhiro Takei, Kanagawa (JP); Masashi Kitada, Kanagawa (JP); Fumihiro Chuman, Kanagawa (JP); Shigetaka Takeda, Kanagawa (JP)

(73) Assignee: MITSUBISHI HITACHI POWER SYSTEMS, LTD., Yokohama-shi, Kanagawa (JP)

( * ) Notice: Subject to any disclaimer, the term of this patent is extended or adjusted under 35 U.S.C. 154(b) by 295 days.

(21) Appl. No.: 15/777,000

(22) PCT Filed: Sep. 13, 2016

(86) PCT No.: PCT/JP2016/076961
§ 371 (c)(1),
(2) Date: May 17, 2018

(87) PCT Pub. No.: WO2017/086003
PCT Pub. Date: May 26, 2017

(65) Prior Publication Data
US 2018/0334626 A1 Nov. 22, 2018

(30) Foreign Application Priority Data
Nov. 18, 2015 (JP) ................................. 2015-225917

(51) Int. Cl.
*F02C 3/28* (2006.01)
*C10J 3/72* (2006.01)
(Continued)

(52) U.S. Cl.
CPC ................. *C10J 3/723* (2013.01); *C01B 3/02* (2013.01); *C10J 3/20* (2013.01); *C10J 3/48* (2013.01);
(Continued)

(58) Field of Classification Search
CPC ...... F02C 3/28; F02C 3/26; F02C 3/20; F02C 3/205; F23C 10/16; C10J 3/723;
(Continued)

(56) References Cited

U.S. PATENT DOCUMENTS 4,270,493 A * 6/1981 Blaskowski ............... C10J 3/86
122/7 R
4,377,132 A * 3/1983 Koog ......................... C10J 3/86
122/7 R
(Continued)

FOREIGN PATENT DOCUMENTS

JP 61-207493 A 9/1986
JP 64-56787 A 3/1989
(Continued)

OTHER PUBLICATIONS

International Search Report dated Oct. 25, 2016, issued in counterpart International Application No. PCT/JP2016/076961 (1 page).

*Primary Examiner* — Gerald L Sung
(74) *Attorney, Agent, or Firm* — Westerman, Hattori, Daniels & Adrian, LLP

(57) ABSTRACT

A gasification apparatus for gasifying a carbonaceous feedstock to produce raw syngas includes a gasifier in which the raw syngas flows, a heat exchanger provided inside the gasifier downstream to exchange heat with the raw syngas,
(Continued)

a hanger pipe through which a part of water supplied from a water supply passage flows to support a load of the heat exchanger, a heat exchanger inflow passage configured to cause the water flowing out from the hanger pipe to flow to an inflow side of the heat exchanger, a bypass passage branching from the water supply passage to cause a remaining of the water supplied to the hanger pipe, a bypass valve provided in the bypass passage, and a control device configured to control, depending on a gasifier load, an opening degree of the bypass valve to adjust the water supplied to the hanger pipe and the bypass passage.

11 Claims, 6 Drawing Sheets

(51) Int. Cl.
| | |
|---|---|
| F01K 23/10 | (2006.01) |
| F02C 6/18 | (2006.01) |
| C10J 3/48 | (2006.01) |
| C01B 3/02 | (2006.01) |
| C10J 3/20 | (2006.01) |
| F02C 3/24 | (2006.01) |
| F22B 1/18 | (2006.01) |

(52) U.S. Cl.
CPC ............... *C10J 3/485* (2013.01); *C10J 3/721* (2013.01); *F01K 23/10* (2013.01); *F02C 3/24* (2013.01); *F02C 3/28* (2013.01); *F02C 6/18* (2013.01); *C10J 2300/093* (2013.01); *C10J 2300/1246* (2013.01); *C10J 2300/1653* (2013.01); *F22B 1/1815* (2013.01); *Y02E 20/16* (2013.01); *Y02E 20/18* (2013.01)

(58) Field of Classification Search
CPC ........ C10J 3/02; C10J 3/48; C10J 2300/1653; C10J 2300/1246; F01K 23/067; F22B 1/1846
See application file for complete search history.

(56) References Cited

U.S. PATENT DOCUMENTS

| | | | | |
|---|---|---|---|---|
| 4,680,035 | A | * | 7/1987 | Tanca ........................ C10J 3/485 48/63 |
| 4,738,224 | A | * | 4/1988 | Bruckner ................ F22B 29/02 122/421 |
| 9,550,949 | B2 | | 1/2017 | Yokohama et al. |
| 2008/0175770 | A1 | * | 7/2008 | Wallace .................... F02C 6/18 422/201 |
| 2008/0295480 | A1 | * | 12/2008 | Hyakutake ............... C10J 3/723 60/39.12 |
| 2010/0175321 | A1 | * | 7/2010 | Harned .................... C10J 3/506 48/87 |
| 2011/0120012 | A1 | | 5/2011 | Balmas et al. |
| 2014/0041358 | A1 | * | 2/2014 | Shibata ..................... C10J 3/86 60/39.12 |
| 2015/0240176 | A1 | | 8/2015 | Yokohama et al. |

FOREIGN PATENT DOCUMENTS

| | | |
|---|---|---|
| JP | 2013-221068 A | 10/2013 |
| JP | 2014-80506 A | 5/2014 |

* cited by examiner

US 10,808,191 B2

GASIFICATION APPARATUS, CONTROL DEVICE, INTEGRATED GASIFICATION COMBINED CYCLE, AND CONTROL METHOD

FIELD

The present invention relates to a gasification apparatus configured to produce raw syngas by gasifying a carbonaceous feedstock, such as coal, a control device for the gasification apparatus, an integrated gasification combined cycle, and a control method for the gasification apparatus.

BACKGROUND

Conventionally, as a gasification apparatus, a carbonaceous fuel gasification apparatus (coal gasification apparatus) configured to supply a carbonaceous feedstock such as coal into a gasifier and gasify the carbonaceous feedstock by partial combustion to produce combustible gas has been known (see, for example, Patent Literature 1). In the coal gasification apparatus, a heat exchanger is provided inside a gasifier, and the heat exchanger is supported by a hanger tube (hanger pipe).

Furthermore, a gasification apparatus including a cooling pipe (hanger pipe) that hangs and supports a heat exchanger provided in a gasifier has been known (see, for example, Patent Literature 2). In the gasification apparatus in Patent Literature 2, a feedwater system is branched into two systems. One of the feedwater systems is connected to an economizer, which is a heat exchanger, and the other feedwater system is connected to the cooling pipe.

CITATION LIST

Patent Literature

Patent Literature 1: Japanese Patent Application Laid-open No. S61-207493
Patent Literature 2: Japanese Patent Application Laid-open No. 2013-221068

SUMMARY

Technical Problem

A conceivable configuration of the gasification apparatus is to supply water to a hanger pipe and cause water flowing out from the hanger pipe to flow into an economizer (ECO). In this case, the total amount of water supplied from the feedwater system flows through the hanger pipe. Thus, in order to supply a predetermined amount of water to the economizer, the flow velocity of water needs to be increased to secure the flow rate of water. When the flow velocity of water is increased, corrosion of oxide coating in the hanger pipe, that is, what is called flow-accelerated corrosion (FAC) is accelerated. Furthermore, the length of a flow path in which water flows into the economizer through the hanger pipe is increased, and hence a pressure loss in the flow path is increased to increase a load in a water supply pump.

In the gasification apparatus in Patent Literature 2, the feedwater system is branched into two systems, one of the feedwater systems is connected to the economizer, and the other feedwater system is connected to the hanger pipe. Thus, when the feedwater system on the economizer side is closed, the supply of water to the economizer is stopped, and the economizer may overheat.

It is therefore an object of the present invention to provide a gasification apparatus, a control device for a gasification apparatus, an integrated gasification combined cycle, and a control method for a gasification apparatus, which are capable of appropriately supplying water to a heat exchanger and a hanger pipe.

Solution to Problems

A gasification apparatus according to the present invention is for gasifying a carbonaceous feedstock to produce raw syngas. The gasification apparatus includes a gasifier in which the raw syngas flows, a heat exchanger provided inside the gasifier on a downstream side where the raw syngas flows to exchange heat with the raw syngas, a hanger pipe through which at least a part of water supplied from a water supply passage flows, the hanger pipe being configured to support a load of the heat exchanger, a heat exchanger inflow passage configured to cause the water flowing out from the hanger pipe to flow to an inflow side of the heat exchanger, a bypass passage branching from the water supply passage to cause a remaining of the water supplied to the hanger pipe to flow through the heat exchanger inflow passage, a bypass valve provided in the bypass passage, and a control device configured to control, depending on a gasifier load that is a load in the gasifier, an opening degree of the bypass valve to adjust an amount of the water supplied to the hanger pipe and the bypass passage.

Furthermore, a control device according to the present invention is for a gasification apparatus for gasifying a carbonaceous feedstock to produce raw syngas. The gasification apparatus includes a gasifier in which the raw syngas flows, a heat exchanger provided inside the gasifier on a downstream side where the raw syngas flows to exchange heat with the raw syngas, a hanger pipe through which at least a part of water supplied from a water supply passage flows, the hanger pipe being configured to support a load of the heat exchanger, a heat exchanger inflow passage configured to cause the water flowing out from the hanger pipe to flow to an inflow side of the heat exchanger, a bypass passage branching from the water supply passage to cause a remaining of the water supplied to the hanger pipe to flow through the heat exchanger inflow passage, and a bypass valve provided in the bypass passage. The control device is configured to control, depending on a gasifier load that is a load in the gasifier, an opening degree of the bypass valve to adjust an amount of the water supplied to the hanger pipe and the bypass passage.

Furthermore, a control method according to the present invention is for a gasification apparatus for gasifying a carbonaceous feedstock to produce raw syngas. The gasification apparatus includes a gasifier in which the raw syngas flows, a heat exchanger provided inside the gasifier on a downstream side where the raw syngas flows to exchange heat with the raw syngas, a hanger pipe through which at least a part of water supplied from a water supply passage flows, the hanger pipe being configured to support a load of the heat exchanger, a heat exchanger inflow passage configured to cause the water flowing out from the hanger pipe to flow to an inflow side of the heat exchanger, a bypass passage branching from the water supply passage to cause a remaining of the water supplied to the hanger pipe to flow through the heat exchanger inflow passage, and a bypass valve provided in the bypass passage. The control method includes controlling an opening degree of the bypass valve depending on a gasifier load that is a load in the gasifier, to adjust an amount of the water supplied to the hanger pipe and the bypass passage.

With this configuration, water supplied from the water supply passage flows through the hanger pipe, then flows through the heat exchanger inflow passage, and flows into the heat exchanger. Furthermore, when the bypass valve is opened, the water supplied from the water supply passage flows through the bypass passage, and flows into the heat exchanger. Thus, when the flow velocity of water in the hanger pipe is high, the water can be caused to flow into the bypass passage by opening the bypass valve, and hence flow-accelerated corrosion of the hanger pipe can be suppressed. Furthermore, because water is caused to flow through the bypass passage, the length of a flow path from the water supply passage in which the water flows into the heat exchanger can be reduced, and hence a pressure loss in the flow path to the heat exchanger can be reduced. In addition, even when the bypass passage is closed, water can be caused to flow through the hanger pipe and the heat exchanger, and hence the overheating of the hanger pipe and the heat exchanger can be suppressed.

Furthermore, it may be preferable that the control device is configured to close the bypass valve from when the carbonaceous feedstock is input into the gasifier at activation until when the gasifier load reaches a set load, and the set load is a gasifier load with which a flow velocity in the hanger pipe is equal to or lower than an upper limit flow velocity regulated by design.

With this configuration, until the gasifier load reaches the set load since the activation, the total amount of water supplied from the water supply passage is small, and hence the total amount of water from the water supply passage can be caused to flow through the hanger pipe. Thus, the hanger pipe and the heat exchanger can be appropriately cooled. Consequently, the strength of the hanger pipe can be prevented from being decreased due to abnormal heating of the hanger pipe when the flow rate of the hanger pipe decreases. Here, the upper limit flow velocity is set to a flow velocity at which flow-accelerated corrosion of the hanger pipe is not accelerated, and the set load is set to be equal to or lower than the upper limit flow velocity. Consequently, even when the total amount of water is caused to flow through the hanger pipe, flow-accelerated corrosion of the hanger pipe can be suppressed.

Furthermore, it may be preferable that the control device is configured to open the bypass valve with a minimum opening degree from when the carbonaceous feedstock is input into the gasifier at activation until when the gasifier load reaches a set load, and the set load is a gasifier load with which a flow velocity in the hanger pipe is equal to or lower than an upper limit flow velocity regulated by design.

With this configuration, in the period from the activation to when the gasifier load reaches the set load, a small amount of water supplied from the water supply passage can be caused to flow through the bypass passage, and the remaining total amount of water supplied from the water supply passage can be caused to flow through the hanger pipe. Thus, because water can be caused to flow through the bypass passage, the bypass valve can be prevented from being fixed in the closed state, and the water can be appropriately caused to flow through the hanger pipe and the heat exchanger. Specifically, the minimum opening degree of the bypass valve is set to an opening degree that can prevent the fixation of the bypass valve, and is, for example, about 1 to 50%.

Furthermore, it may be preferable that the control device executes valve opening operation control for operating the bypass valve to an open side when the gasifier load is equal to or larger than a set load, and the set load is a gasifier load with which a flow velocity in the hanger pipe is equal to or lower than an upper limit flow velocity regulated by design.

With this configuration, when the gasifier load becomes equal to or larger than the set load, the bypass valve is operated to the open side, and hence a part of water supplied from the water supply passage can be caused to flow through the bypass passage. Thus, the flow velocity of water flowing through the hanger pipe can be set to be lower than the upper limit flow velocity, and hence flow-accelerated corrosion of the hanger pipe can be suppressed, and a pressure loss in the flow path to the heat exchanger can be reduced.

Furthermore, it may be preferable that the control device sets the opening degree of the bypass valve to a predetermined constant opening degree when the valve opening operation control for the bypass valve is executed.

With this configuration, the opening degree of the bypass valve can be maintained to a predetermined constant opening degree, and hence it is unnecessary to adjust the opening degree of the bypass valve. Consequently, water can be caused to flow through the hanger pipe and the bypass passage stably. Note that the predetermined constant opening degree of the bypass valve is set to an opening degree with which the flow velocity of water flowing through the hanger pipe does not exceed the upper limit flow velocity.

Furthermore, it may be preferable that an outlet header provided between the hanger pipe and the heat exchanger inflow passage and a first temperature detector configured to detect a temperature of the water in the outlet header are further included, and the control device is configured to execute, when a first detected temperature detected by the first temperature detector is equal to or higher than a target monitoring temperature lower than a saturated vapor temperature at a pressure of the water, valve closing operation control for operating the bypass valve to a closed side.

With this configuration, when the first detected temperature rises to reach the target monitoring temperature, the bypass valve is operated to the closed side, and hence the amount of water flowing through the hanger pipe increases. When the amount of water flowing through the hanger pipe increases, the temperature of water decreases. Thus, the temperature of water supplied from the hanger pipe to the outlet header can be decreased. Consequently, the evaporation of water in the outlet header can be suppressed, and hence water can be appropriately caused to flow from the outlet header toward the heat exchanger through the heat exchanger inflow passage.

Furthermore, it may be preferable that an outlet header provided between the hanger pipe and the heat exchanger inflow passage a first temperature detector configured to detect a temperature of the water in the outlet header are further included, and the control device is configured to adjust, when the valve opening operation control for the bypass valve is executed, the opening degree of the bypass valve such that a first detected temperature detected by the first temperature detector becomes equal to or lower than a target monitoring temperature lower than a saturated vapor temperature at a pressure of the water.

With this configuration, the opening degree of the bypass valve can be adjusted based on the first detected temperature, and hence the temperature of water can be set to be equal to or lower than the target monitoring temperature. Consequently, the evaporation of water in the outlet header can be suppressed, and hence water can be appropriately caused to flow from the outlet header toward the heat exchanger through the heat exchanger inflow passage.

Furthermore, it may be preferable that a second temperature detector configured to detect a temperature of the water flowing out from an effluent port of the heat exchanger is further included, and the control device is configured to execute, when a second detected temperature detected by the second temperature detector reaches a target monitoring temperature lower than a saturated vapor temperature at a pressure of the water, valve opening operation control for operating the bypass valve to an open side.

With this configuration, when the second detected temperature rises to reach the target monitoring temperature, the opening degree of the bypass valve increases, and hence the amount of water flowing through the bypass passage increases. When the amount of water flowing through the bypass passage increases, the temperature of water decreases. Thus, the temperature of water supplied from the bypass passage to the heat exchanger can be decreased. Consequently, evaporation of water flowing out from an effluent port of the heat exchanger can be suppressed.

An integrated gasification combined cycle according to the present invention includes the gasification apparatus for gasifying a carbonaceous feedstock to produce raw syngas, a gas turbine configured to be rotationally driven by combusting at least a part of the raw syngas produced by the gasification apparatus, a steam turbine configured to be rotationally driven by steam produced by a heat recovery steam generator into which turbine flue gas discharged from the gas turbine is introduced, and a generator coupled to the gas turbine and the steam turbine.

With this configuration, raw syngas produced by the highly reliable gasification apparatus can be supplied to the gas turbine, so that the gas turbine and the steam turbine can be rotationally driven to generate power by the generator.

DESCRIPTION OF EMBODIMENTS

Embodiments of the present invention are described in detail below with reference to the drawings. Note that the present invention is not limited by the embodiments. Furthermore, components in the following embodiments include components that can easily be replaced by a person skilled in the art or substantially the same components. In addition, the components described below can be combined as appropriate, and when there are a plurality of embodiments, the embodiments can be combined as well.

First Embodiment

Figure 1:
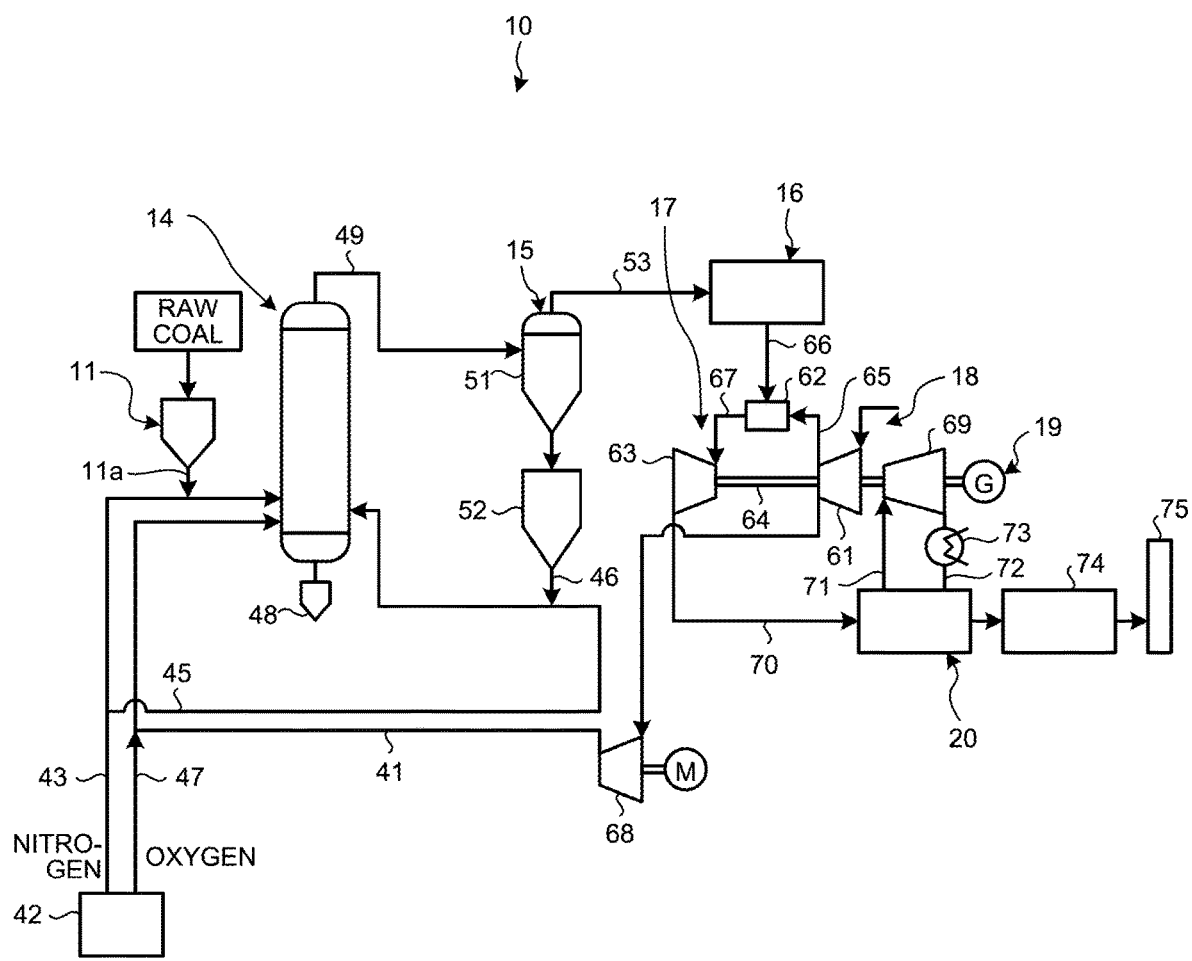
FIG. 1 is a schematic configuration diagram of A coal integrated gasification combined cycle to which a gasification apparatus according to a first embodiment is applied.
Figure 2:
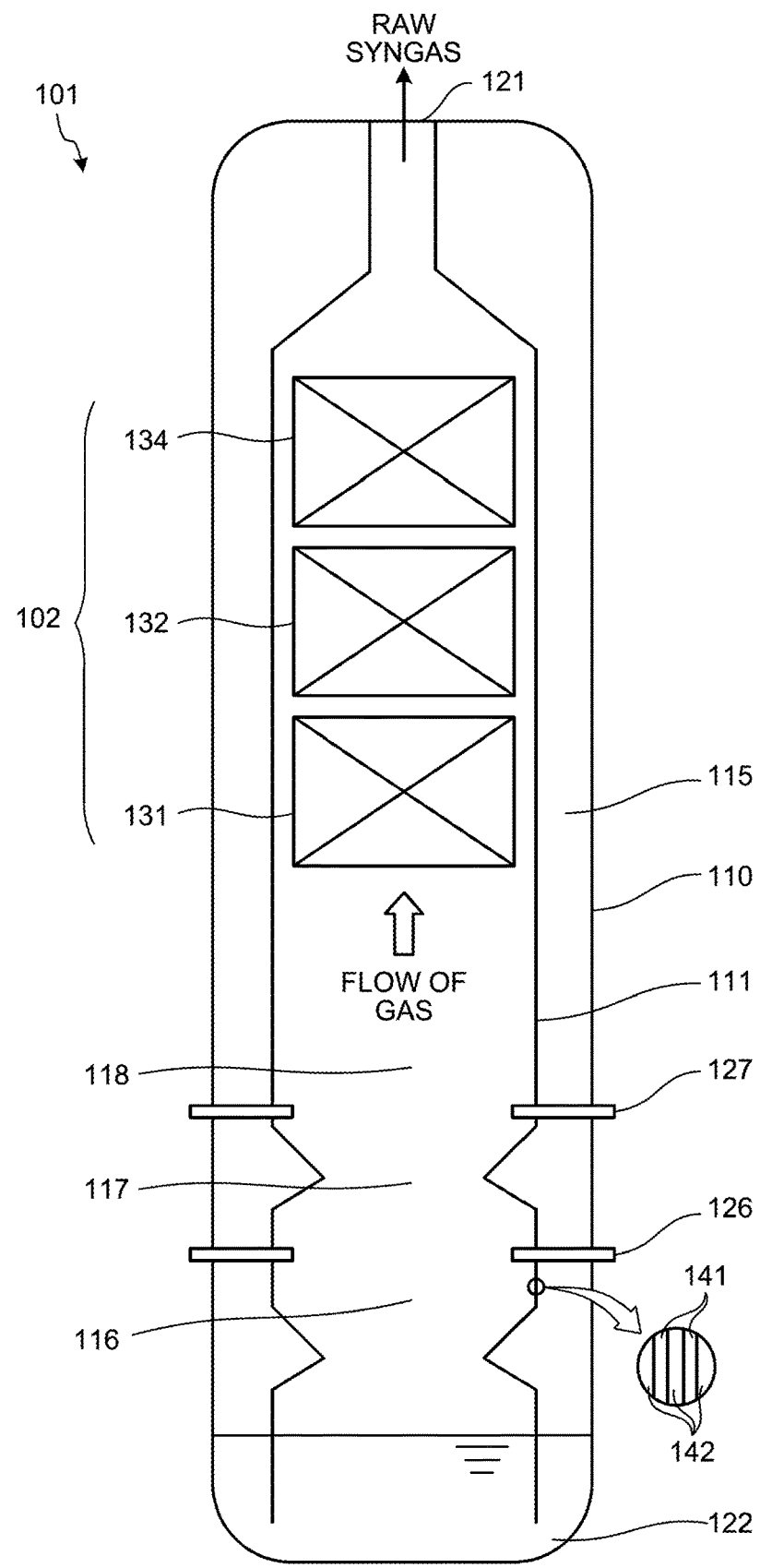
FIG. 2 is a schematic configuration diagram illustrating the gasification apparatus according to the first embodiment.
Figure 3:
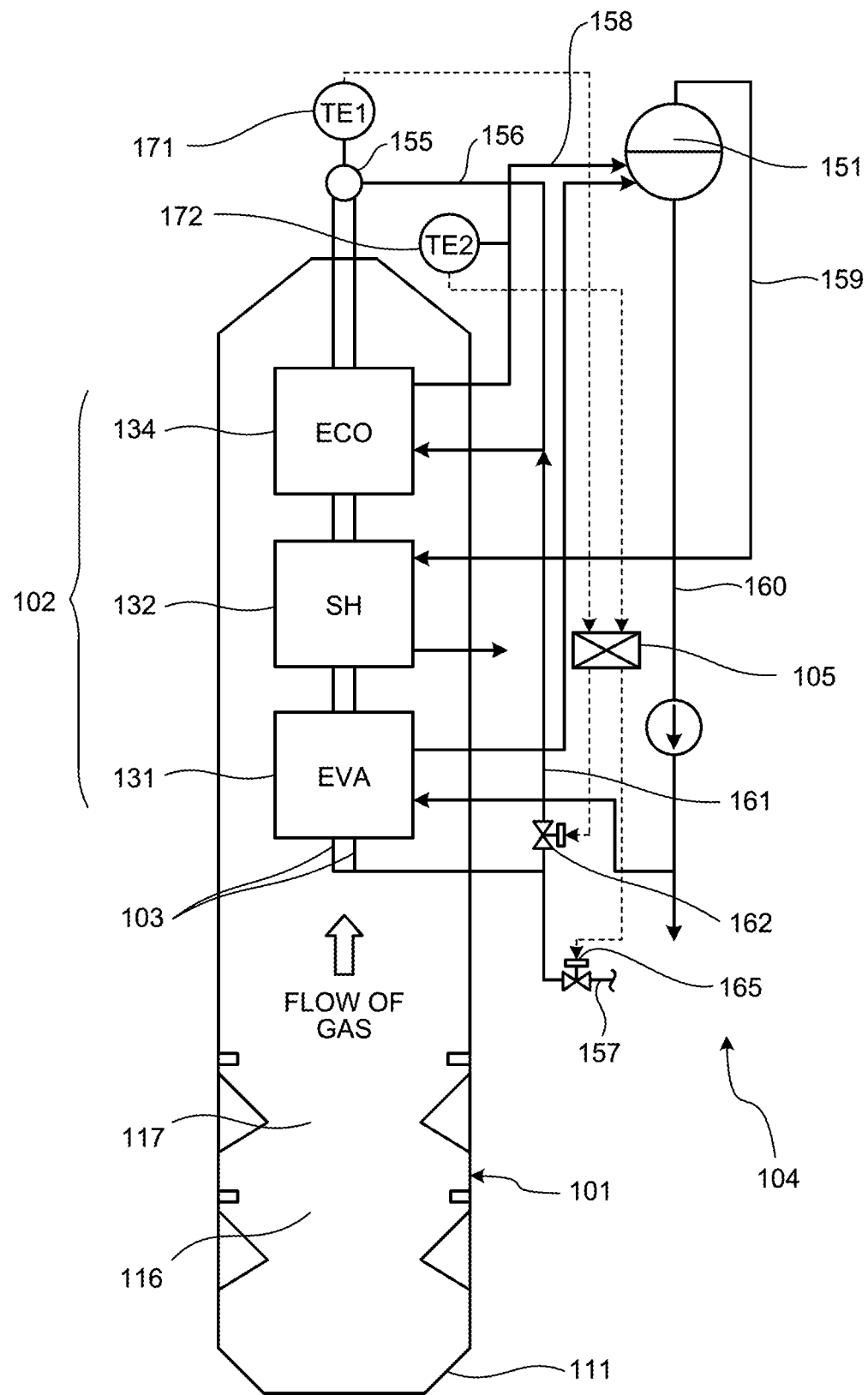
FIG. 3 is a schematic diagram illustrating a feedwater system in the gasification apparatus according to the first embodiment.

FIG. 1 is a schematic configuration diagram of a coal integrated gasification combined cycle to which a gasification apparatus according to a first embodiment is applied. FIG. 2 is a schematic configuration diagram illustrating the gasification apparatus according to the first embodiment. FIG. 3 is a schematic diagram illustrating a feedwater system of the gasification apparatus according to the first embodiment.

A coal integrated gasification combined cycle (IGCC) 10 to which a gasification apparatus 14 according to the first embodiment is applied uses air as oxygen containing gas, and employs an air combustion system in which the gasification apparatus 14 produces raw syngas from a fuel. Then, in the coal integrated gasification combined cycle 10, the raw syngas produced by the gasification apparatus 14 is refined by a gas purifier 16 to obtain fuel gas, and the fuel gas is then supplied to a gas turbine plant 17 to generate power. Specifically, the coal integrated gasification combined cycle 10 according to the first embodiment is a cycle using an air combustion system (air blowing). As a fuel supplied to the gasification apparatus 14, for example, a carbonaceous feedstock such as coal is used.

As illustrated in FIG. 1, the coal integrated gasification combined cycle 10 includes a stoker 11, the gasification apparatus 14, a char recovery unit 15, the gas purifier 16, the gas turbine plant 17, a steam turbine plant 18, a generator 19, and a heat recovery steam generator (HRSG) 20.

The stoker 11 is supplied with coal, which is a carbonaceous feedstock, as raw coal, and mills the coal with a coal mill (not shown) or the like to manufacture pulverized coal obtained by milling the coal into fine particles. The pulverized coal manufactured by the stoker 11 is supplied toward the gasification apparatus 14 by nitrogen serving as carrier inert gas supplied from an air separation unit 42 described later. The inert gas has an oxygen content of about 5% by volume or less. Representative examples of the inert gas include nitrogen gas, carbon dioxide gas, and argon gas, but the oxygen content is not necessarily required to be limited to about 5% or less.

The gasification apparatus 14 is supplied with pulverized coal manufactured by the stoker 11, and char (unburnt coal) recovered by the char recovery unit 15 is returned to the gasification apparatus 14 such that the char is reusable.

Furthermore, a compressed air supply line 41 from the gas turbine plant 17 (compressor 61) is connected to the gasification apparatus 14, and air compressed by the gas turbine plant 17 can be supplied to the gasification apparatus 14. The air separation unit 42 separates and produces nitrogen and oxygen from air in the atmosphere, and the air separation unit 42 and the gasification apparatus 14 are connected to each other through a first nitrogen supply line 43. Then, a coal feed line 11a from the stoker 11 is connected to the first nitrogen supply line 43. Furthermore, a second nitrogen supply line 45 branching from the first nitrogen supply line 43 is also connected to the gasification apparatus 14, and a char return line 46 from the char recovery unit 15 is connected to the second nitrogen supply line 45. In addition, the air separation unit 42 is connected to the compressed air supply line 41 through an oxygen supply line 47. Then, nitrogen separated by the air separation unit 42 flows through the first nitrogen supply line 43 and the second nitrogen supply line 45 to be used as gas for conveying coal and char. Furthermore, oxygen separated by the air separation unit 42 flows through the oxygen supply line 47 and the compressed air supply line 41 to be used as oxygen containing gas in the gasification apparatus 14.

For example, the gasification apparatus 14 has a two-stage entrained-bed gasifier. The gasification apparatus 14 partially combusts coal (pulverized coal) supplied to the inside thereof with oxygen containing gas (air, oxygen) to produce combustible gas. Note that, in the gasification apparatus 14, a foreign substance removal unit 48 configured to remove foreign substances mixed in pulverized coal is provided. Note that the gasification apparatus 14 is not limited to an entrained-bed gasifier, and may be a fluid-bed gasifier or a fixed-bed gasifier. Then, a gas production line 49 for supplying combustible gas toward the char recovery unit 15 is connected to the gasification apparatus 14, and combustible gas containing char can be discharged. In this case, a gas cooler may be provided to the gas production line 49, so that combustible gas can be supplied to the char recovery unit 15 after being cooled to a predetermined temperature.

The char recovery unit 15 includes a dust collector 51 and a supply hopper 52. In this case, the dust collector 51 is configured by one or more porous filters or cyclones, and can separate char contained in combustible gas produced by the gasification apparatus 14. Then, combustible gas from which char has been separated is sent to the gas purifier 16 through a gas discharge line 53. The supply hopper 52 stores therein char separated from the combustible gas by the dust collector 51. Note that a bin may be disposed between the dust collector 51 and the supply hopper 52, and a plurality of the supply hoppers 52 may be connected to the bin. Then, the char return line 46 from the supply hopper 52 is connected to the second nitrogen supply line 45.

The gas purifier 16 performs purifies the combustible gas from which char has been separated by the char recovery unit 15 by removing impurities such as sulfur compounds and nitrogen compounds. Then, the gas purifier 16 purifies the combustible gas to manufacture fuel gas, and supplies the fuel gas to the gas turbine plant 17. Note that the combustible gas from which char has been separated still contains sulfur contents (such as $H_2S$), and hence the gas purifier 16 removes the sulfur contents with an amine absorbent, so that the sulfur contents are finally recovered as gypsum and effectively used.

The gas turbine plant 17 has the compressor 61, a combustor 62, and a turbine 63. The compressor 61 and the turbine 63 are coupled to each other through a rotating shaft 64. A compressed air supply line 65 for compressed air from the compressor 61, a fuel gas supply line 66 for fuel gas from the gas purifier 16, and a combustion gas supply line 67 extending toward the turbine 63 are connected to the combustor 62. Furthermore, in the gas turbine plant 17, the compressed air supply line 41 extending from the compressor 61 to the gasification apparatus 14 is provided, and a booster 68 is provided at a middle part. Thus, in the combustor 62, compressed air supplied from the compressor 61 and fuel gas supplied from the gas purifier 16 are mixed and combusted to produce combustion gas, and the produced combustion gas is supplied to the turbine 63. Then, the turbine 63 rotationally drives the rotating shaft 64 with the supplied combustion gas, thereby rotationally driving the generator 19.

The steam turbine plant 18 has a turbine 69 coupled to the rotating shaft 64 in the gas turbine plant 17. The generator 19 is coupled to a distal end portion of the rotating shaft 64. The heat recovery steam generator 20 is connected with a flue gas line 70 for flue gas from the gas turbine plant 17 (turbine 63), and exchanges heat between water and high-temperature flue gas to produce steam. A steam supply line 71 is provided between the heat recovery steam generator 20 and the turbine 69 in the steam turbine plant 18, a steam recovery line 72 is provided therebetween, and a condenser 73 is provided in the steam recovery line 72. Furthermore, steam produced by the heat recovery steam generator 20 may include the one obtained by further exchanging heat in the heat recovery steam generator 20 with steam produced by heat exchange with the raw syngas in a heat exchanger 102 in a gasifier 101. Thus, in the steam turbine plant 18, the turbine 69 is rotationally driven by steam supplied from the heat recovery steam generator 20 to rotate the rotating shaft 64, thereby rotationally driving the generator 19.

Then, a gas purifying device 74 removes harmful substances from the flue gas from which heat has been recovered by the heat recovery steam generator 20, and the purified flue gas is released to the atmosphere from a stack 75.

Now, operations of the coal integrated gasification combined cycle 10 according to the first embodiment are described.

In the coal integrated gasification combined cycle 10 according to the first embodiment, when raw coal (coal) is supplied to the stoker 11, the coal is milled into fine particles by the stoker 11 to be pulverized coal. The pulverized coal manufactured by the stoker 11 flows through the first nitrogen supply line 43 by nitrogen supplied from the air separation unit 42, and is supplied to the gasification apparatus 14. Furthermore, char recovered by the char recovery unit 15 described later flows through the second nitrogen supply line 45 by nitrogen supplied from the air separation unit 42, and is supplied to the gasification apparatus 14. In addition, compressed air bled from the gas turbine plant 17 described later is boosted by the booster 68, and then flows through the compressed air supply line 41 to be supplied to the gasification apparatus 14 together with oxygen supplied from the air separation unit 42.

In the gasification apparatus 14, the supplied pulverized coal and char are combusted by compressed air (oxygen), and the pulverized coal and char are gasified to produce combustible gas (raw syngas). Then, the combustible gas is discharged from the gasification apparatus 14 through the gas production line 49, and is sent to the char recovery unit 15.

In the char recovery unit 15, the combustible gas is first supplied to the dust collector 51, and fine char contained in the combustible gas is separated. Then, the combustible gas from which char has been separated is sent to the gas purifier 16 through the gas discharge line 53. On the other hand, the fine char separated from the combustible gas deposits on the supply hopper 52, and is returned to the gasification apparatus 14 through the char return line 46 to be recycled.

The combustible gas from which char has been separated by the char recovery unit 15 is purified by the gas purifier 16 by removing impurities such as sulfur compounds and nitrogen compounds, thereby manufacturing fuel gas. Then, in the gas turbine plant 17, when the compressor 61 produces compressed air and supplies the compressed air to the combustor 62, the combustor 62 mixes the compressed air supplied from the compressor 61 with the fuel gas supplied from the gas purifier 16 to produce combustion gas, and the turbine 63 is rotationally driven with the combustion gas, so that the generator 19 can be rotationally driven through the rotating shaft 64 to generate power.

Then, exhaust gas discharged from the turbine 63 in the gas turbine plant 17 exchanges heat with water in the heat recovery steam generator 20 to produce steam, and the produced steam is supplied to the steam turbine plant 18. In the steam turbine plant 18, the turbine 69 can be rotationally driven by the steam supplied from the heat recovery steam generator 20, and the generator 19 can be rotationally driven through the rotating shaft 64 to generate power.

After that, in the gas purifying device 74, harmful substances in the exhaust gas discharged from the heat recovery steam generator 20 are removed, and the purified flue gas is released to the atmosphere through the stack 75.

Next, the gasification apparatus 14 in the above-mentioned coal integrated gasification combined cycle 10 is described in detail with reference to FIG. 1 to FIG. 3.

As illustrated in FIG. 2 and FIG. 3, the gasification apparatus 14 includes the gasifier 101, the heat exchanger 102, a hanger pipe 103, a feedwater system 104, and a control device 105.

The gasifier 101 is famed to extend in the vertical direction. Pulverized coal and oxygen are supplied to the lower side in the vertical direction, and combustible gas (raw syngas) obtained by gasifying the pulverized coal by partial combustion flows from the lower side to the upper side in the vertical direction. The gasifier 101 includes a pressure vessel 110, and a gasifier wall 111 provided inside the pressure vessel 110. The gasifier 101 has an annulus portion 115 famed in a space between the pressure vessel 110 and the gasifier wall 111. Furthermore, in the gasifier 101, a combustor 116, a diffuser 117, and a reductor 118 are famed in the stated order in a space inside the gasifier wall 111 on the lower side in the vertical direction (that is, on the upstream side in the flowing direction of the raw syngas).

The pressure vessel 110 is formed into a cylindrical shape having a hollow space inside, a gas discharge port 121 is formed at an upper end portion of the pressure vessel 110, and a slag bath 122 is formed at a lower end portion (bottom portion) thereof. The gasifier wall 111 is famed into a rectangular cylindrical shape having a hollow space inside, and the wall surface thereof is provided to be opposed to the inner surface of the pressure vessel 110. Then, the gasifier wall 111 is coupled to the inner surface of the pressure vessel 110 through a support member (not shown).

A part of the gasifier wall 111 has a plurality of heat transfer pipes 141, and a plurality of fins 142 provided between the heat transfer pipes, and is famed such that the heat transfer pipes 141 and the fins 142 are bonded together by welding or the like. An upper end of the gasifier wall 111 is connected to the gas discharge port 121 in the pressure vessel 110, and a lower end of the gasifier wall 111 is provided with a gap from a bottom portion of the pressure vessel 110. Then, water is stored in the slag bath 122 formed at the bottom portion of the pressure vessel 110. The lower end portion of the gasifier wall 111 is immersed in the stored water, thereby sealing the inside and outside of the gasifier wall 111.

The annulus portion 115 is a space famed on the inner side of the pressure vessel 110 and on the outer side of the gasifier wall 111. Nitrogen, which is inert gas separated by the air separation unit 42, is supplied through a nitrogen supply line (not shown). Thus, the annulus portion 115 is a space filled with nitrogen. Note that an in-furnace pressure uniforming pipe (not shown) configured to uniform the pressure in the gasifier 101 is provided in the vicinity of the upper part of the annulus portion 115 in the vertical direction. The in-furnace pressure uniforming pipe is provided to communicate the inside and outside of the gasifier wall 111, and makes uniform the pressures inside the gasifier wall 111 (combustor 116, diffuser 117, and reductor 118) and outside the gasifier wall 111 (annulus portion 115).

The combustor 116 is a space in which pulverized coal, char, and air are partially combusted. A combustion device configured by a plurality of burners 126 is disposed on a gasifier wall 111 of the combustor 116. High-temperature combustion gas obtained by partially combusting pulverized coal and char in the combustor 116 passes through the diffuser 117 to flow into the reductor 118.

The reductor 118 is a space that is maintained to a high-temperature state necessary for gasification reaction and in which pulverized coal is supplied to combustion gas from the combustor 116 and the pulverized coal is pyrolyzed to be volatile components (such as carbon monoxide, hydrogen, and low hydrocarbon) to be gasified, thereby producing combustible gas. The combustion device formed of burners 127 is disposed on the gasifier wall 111 of the reductor 118.

The heat exchanger 102 is provided inside the gasifier wall 111, and provided above the burner 127 in the reductor 118 in the vertical direction. In the heat exchanger 102, an evaporator 131, a superheater 132, and an economizer 134 are disposed in the stated order from the vertically lower side of the gasifier wall 111 (upstream side of raw syngas in flowing direction). The heat exchanger 102 exchanges heat with raw syngas produced in the reductor 118 to cool the raw syngas. Note that the numbers of evaporators 131, superheaters 132, and economizers 134 are not limited to the ones illustrated in the figures.

As illustrated in FIG. 3, the hanger pipes 103 are provided to extend in the vertical direction and are provided side by side in the horizontal direction. An upper end of the hanger pipe 103 in the vertical direction is connected to an upper end of the gasifier 101 to hang and support the heat exchanger 102, thereby supporting the load thereof. The inside of the hanger pipe 103 is connected with a feedwater pipe 157 in the feedwater system 104 described later. Water supplied from the feedwater pipe 157 flows from the lower side to the upper side in the vertical direction, that is, from the upstream side to the downstream side in the flowing direction of the raw syngas, thereby preventing an excessive temperature increase causing strength reduction in the hanger pipe 103.

The feedwater system 104 has a feedwater pipe (water supply passage) 157, an outlet header 155, an economizer inflow line (heat exchanger inflow passage) 156 serving as a passage extending from the outlet header 155 toward the economizer (heat exchanger) 134, an economizer effluent line 158 serving as a passage flowing out from the economizer 134, and a steam drum 151 connected to the economizer effluent line 158. Furthermore, the feedwater system 104 has a bypass pipe (bypass passage) 161 and a bypass valve 162 provided to the bypass pipe 161.

Water supplied from a feedwater plant (not shown) provided in the coal integrated gasification combined cycle 10 flows through the feedwater pipe 157. A water supply valve 165 is provided to the feedwater pipe 157. The feedwater pipe 157 is connected to an inflow port of the hanger pipe 103, and causes water to flow toward the hanger pipe 103. The control device 105 is connected to the water supply valve 165. By adjusting the opening degree of the water supply valve 165 by the control device 105, the total amount of water can be adjusted.

The outlet header 155 is connected to an effluent port side of the hanger pipe 103, and water flowing out from the hanger pipe 103 flows into the outlet header 155. In the outlet header 155, a first temperature detection sensor (first temperature detector) 171 configured to detect the temperature of water in the outlet header 155 is provided. The first temperature detection sensor 171 is connected to the control device 105, and outputs a detected first detected temperature to the control device 105.

The economizer inflow line 156 connects an effluent port of the outlet header 155 and an inflow port of the economizer 134 to each other, and causes water flowing out from the outlet header 155 to flow toward the economizer 134. The economizer effluent line 158 connects an effluent port of the economizer 134 and an inflow port of the steam drum 151 to each other, and causes water flowing out from the economizer 134 to flow toward the steam drum 151.

The bypass pipe 161 branches from the feedwater pipe 157 to be connected to the economizer inflow line 156, and serves as a passage through which water in the feedwater pipe 157 flows into the economizer 134 while bypassing the hanger pipe 103.

The control device 105 is connected with the bypass valve 162. By adjusting the opening degree of the bypass valve 162 by the control device 105, the amount of water flowing through the bypass pipe 161 can be adjusted.

The steam drum 151 separates steam from the water inside, and sends the separated steam to the superheater 132 through a steam pipe 159. The superheater 132 superheats the steam with the raw syngas, and the superheated steam is further superheated by the heat recovery steam generator 20 through heat exchange, and is supplied to a steam using plant such as a steam turbine. Furthermore, the steam drum 151 sends a part of the separated water to the evaporator 131 through a water feed pipe 160. The evaporator 131 heats water with the raw syngas, and sends the heated water to the steam drum 151 again.

Now, operations of the gasification apparatus 14 according to the above-mentioned first embodiment are described.

In the gasifier 101 in the gasification apparatus 14, nitrogen and pulverized coal are input and ignited by the burners 127 in the reductor 118, and compressed air (oxygen), pulverized coal, and char are input and ignited by the burners 126 in the combustor 116. Then, in the combustor 116, high-temperature combustion gas is generated by partial combustion of pulverized coal and char. Furthermore, in the combustor 116, melted slag is produced in high-temperature gas due to combustion of the pulverized coal and the char, and the melted slag adheres to the gasifier wall 111 and falls to the bottom of the furnace, and is finally discharged to stored water in the slag bath 122. Then, the high-temperature combustion gas generated in the combustor 116 passes through the diffuser 117 to rise to the reductor 118. In the reductor 118, the pulverized coal is mixed with the high-temperature combustion gas, and gasification reaction is performed in high-temperature reducing atmosphere to produce combustible gas (raw syngas).

In this case, water is supplied from the feedwater pipe 157 to the hanger pipe 103, and the water flowing through the hanger pipe 103 flows into the economizer 134 via the outlet header 155 and the economizer inflow line 156. On the other hand, when the bypass valve 162 is opened, water supplied from the feedwater pipe 157 merges to the economizer inflow line 156 through the bypass pipe 161. Then, the water flowing into the economizer 134 is heated by the economizer 134, and then flows into the steam drum 151 via the economizer effluent line 158.

Next, opening/closing control for the bypass valve 162 by the control device 105 is described. The control device 105 controls the bypass valve 162 in accordance with a gasifier load (GID) that is a load in the gasifier 101. When the gasifier load (GID) is 100%, the gasifier has a rated load. Specifically, the control device 105 closes the bypass valve 162 until the GID reaches a set load (period during which the GID is a low GID). When the bypass valve 162 is closed, the total amount of water from the feedwater pipe 157 is supplied to the hanger pipe 103. The period during which the GID is a low GID can be set and managed as a period from the activation where pulverized coal is input into the gasifier 101 to when the gasifier load reaches a set load. Here, the set load is a gasifier load at which the flow velocity in the hanger pipe 103 becomes equal to or lower than an upper limit flow velocity regulated by design. The upper limit flow velocity based on the design of the hanger pipe 103 falls within the range where corrosion wastage of oxide coating in the hanger pipe manufactured by carbon steel or low-alloy steel pipe, that is, what is called flow-accelerated corrosion (FAC) is not accelerated, and the pressure loss in a long flow path through which water flows into the economizer 134 through the hanger pipe 103 is not increased so that the load in the water supply pump is not excessively large. Thus, specifically, for example, the upper limit flow velocity is set to an upper limit flow velocity (for example: 3 to 10 m/s). On the other hand, the water temperature in the hanger pipe 103 rises to be equal to or higher than a saturated vapor temperature, the pressure loss increases, and hence a lower limit flow velocity for preventing the water temperature from rising to a temperature obtained by adding a subcooled temperature to the saturated vapor temperature is set. The set load in the gasifier at which the flow velocity in the hanger pipe 103 becomes equal to or lower than an upper limit flow velocity is, for example, a load at which the GID is 30% to 50%, more preferably a load at which the GID is 40% to 45%, still more preferably a load at which the GID is 45%. In this manner, the bypass valve 162 is maintained to be closed until the GID reaches the set load from the activation, and hence the control is made easier to achieve stable operation of the feedwater system 104.

Subsequently, when the gasifier load becomes equal to or larger than the set load, the control device 105 executes valve opening operation control for operating the bypass valve 162 to the open side. When executing the valve opening operation control, the control device 105 may execute the valve opening operation control such that the opening degree of the bypass valve 162 becomes a predetermined constant opening degree, or may execute opening/closing adjustment control for adjusting the opening degree of the bypass valve 162 such that the hanger outlet temperature or the like becomes a predetermined temperature. When executing the opening/closing adjustment control, the control device 105 performs feedback control of the opening degree of the bypass valve 162 such that a first detected temperature of the first temperature detection sensor 171, which is a hanger outlet temperature, is equal to or lower than a target monitoring temperature lower than a steam generating temperature (saturated vapor temperature) at which water becomes steam, thereby preventing an abrupt increase in pressure loss caused by steam generation. Specifically, the target monitoring temperature in the opening/closing adjustment control is a temperature obtained by subtracting a predetermined subcooled temperature (for example, about 50° C.) from the saturated vapor temperature calculated based on the pressure in the steam drum 151.

Figure 4:
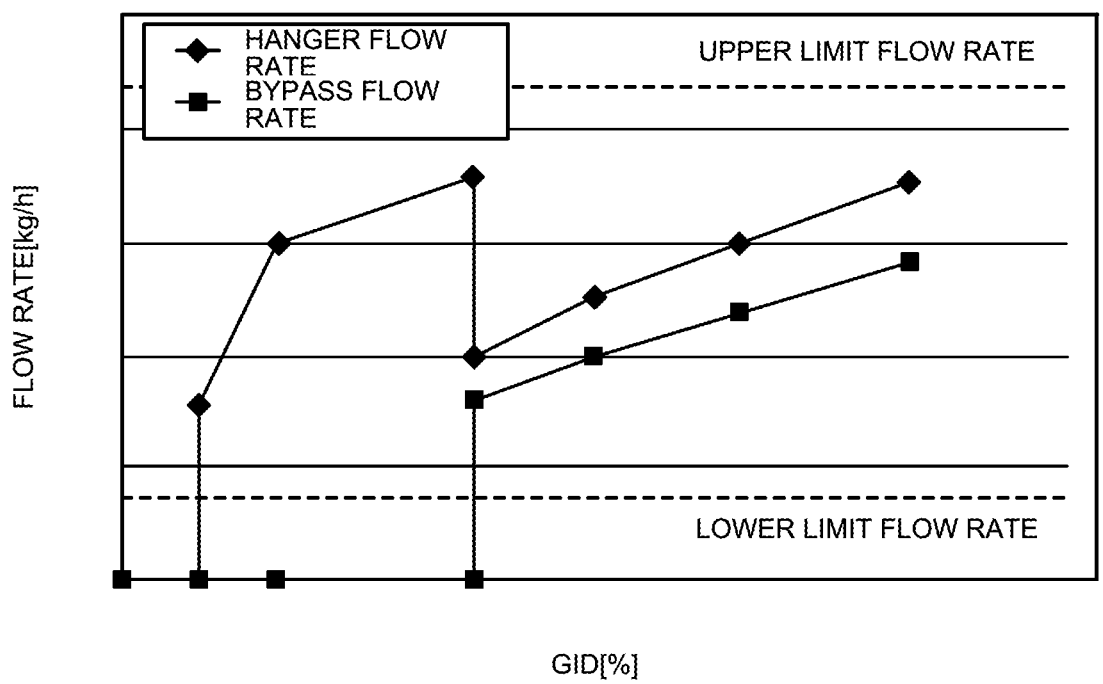
FIG. 4 is a graph related to a water supply flow rate (hanger flow rate) and a bypass flow rate that change depending on a gasifier load.
Figure 5:
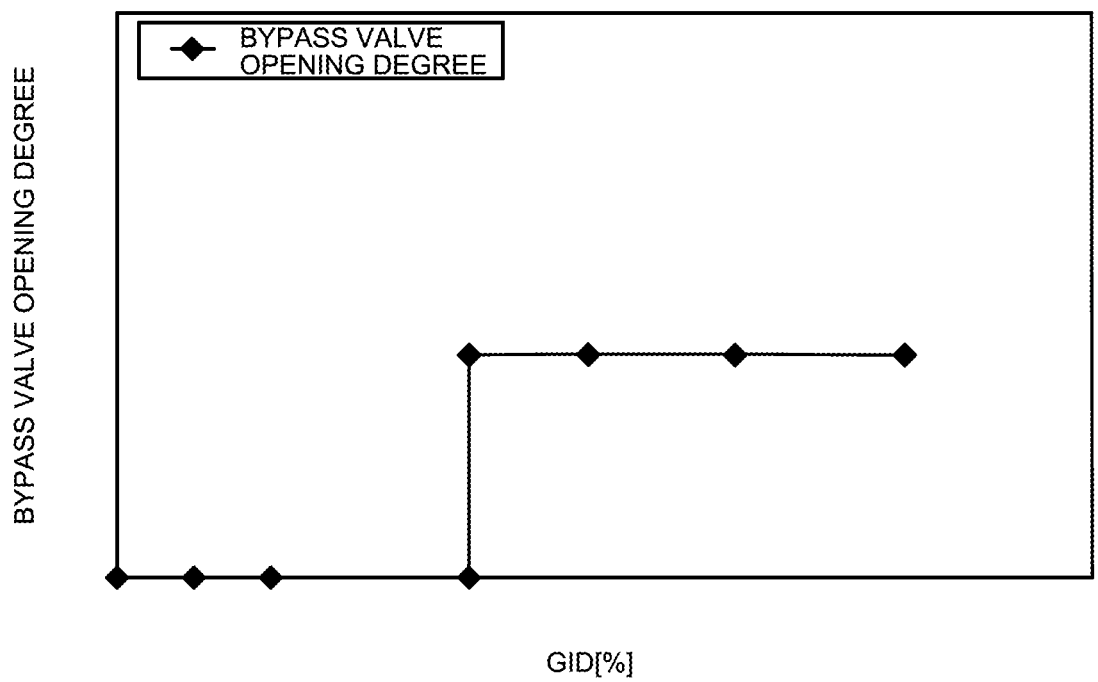
FIG. 5 is a graph related to a bypass valve opening degree that changes depending on the gasifier load.
Figure 6:
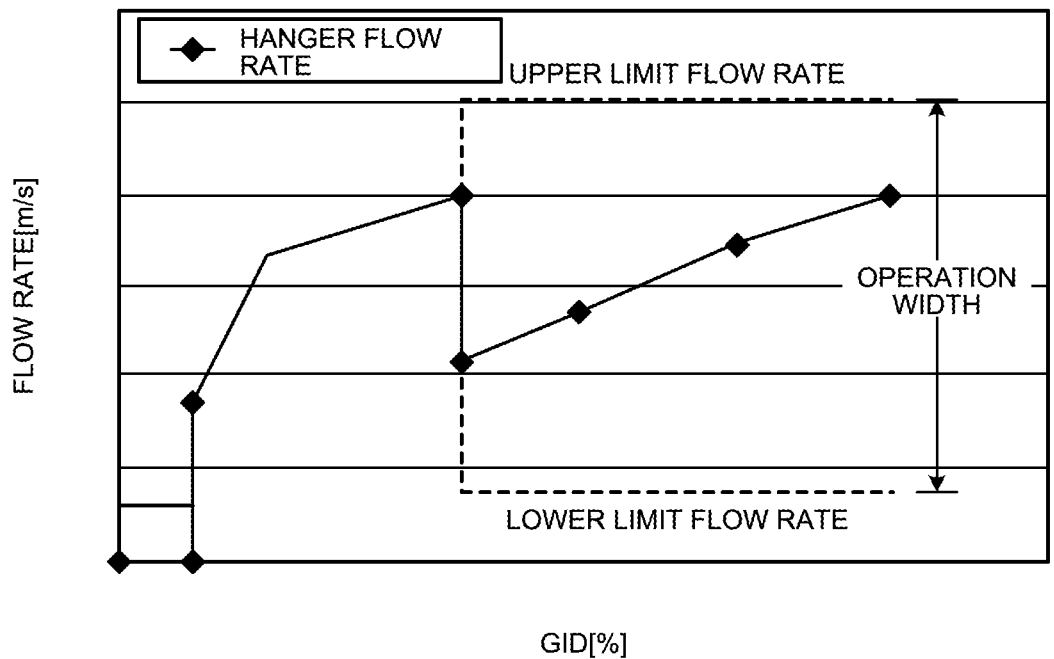
FIG. 6 is a graph related to a water supply flow velocity (hanger flow velocity) that changes depending on the gasifier load.
Figure 7:
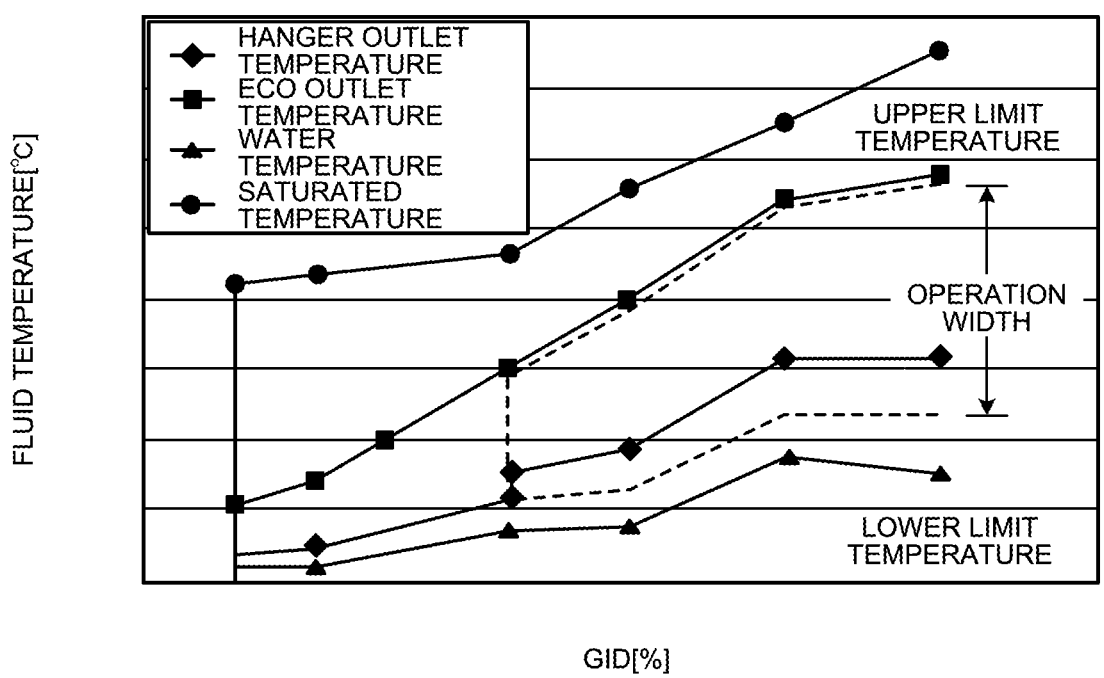
FIG. 7 is a graph related to a water supply temperature that changes depending on the gasifier load.
Figure 8:
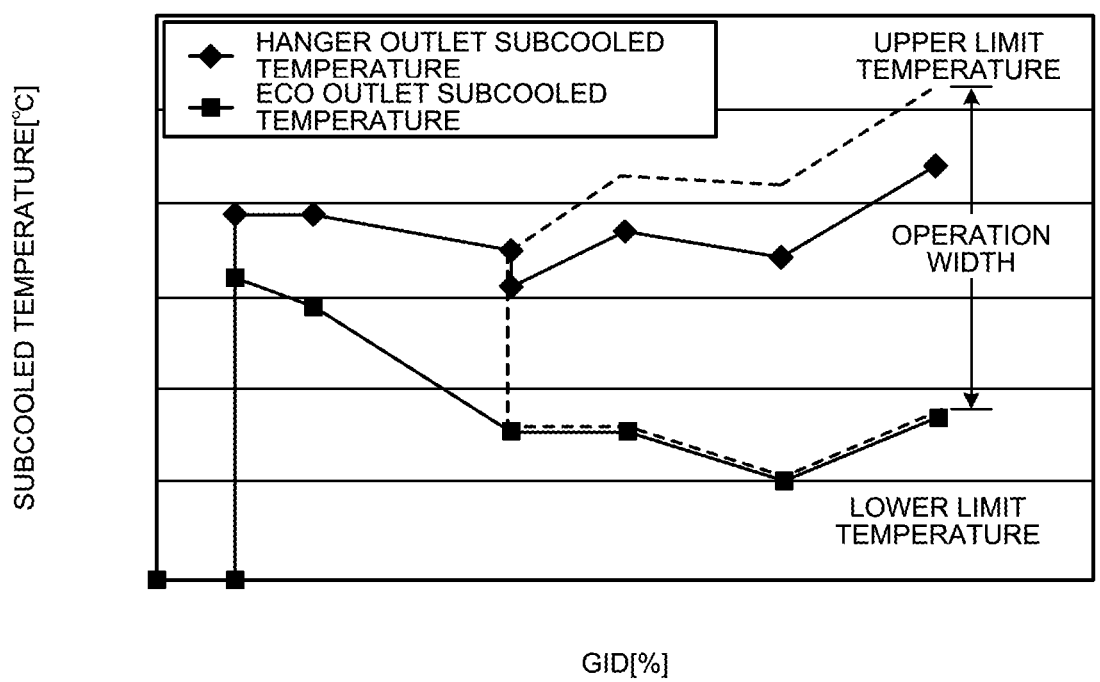
FIG. 8 is a graph related to a subcooled temperature that changes depending on the gasifier load.

Next, various kinds of parameters for water flowing through the hanger pipe 103, which change depending on the gasifier load (GID), are described with reference to FIG. 4 to FIG. 8. FIG. 4 is a graph related to a water supply flow rate (hanger flow rate) and a bypass flow rate that change depending on the gasifier load. FIG. 5 is a graph related to a bypass valve opening degree that changes depending on the gasifier load. FIG. 6 is a graph related to a water supply flow velocity (hanger flow velocity) that changes depending on the gasifier load. FIG. 7 is a graph related to a water supply temperature that changes depending on the gasifier load. FIG. 8 is a graph related to a subcooled temperature that changes depending on the gasifier load. Note that FIG. 4 to FIG. 8 are the graphs in a case where the control device 105 executes valve opening operation control for setting the opening degree of the bypass valve 162 to a predetermined constant opening degree when the gasifier load becomes equal to or larger than a set load. The predetermined constant opening degree is set such that even when the gasifier load becomes a rated load (100%) or an overload (120%), the flow velocity in the hanger pipe 103 does not exceed the limit flow velocity.

In FIG. 4, the horizontal axis represents the gasifier load, and values when GID=100% are plotted on the right side in FIG. 4. Furthermore, in FIG. 4, the vertical axis represents the flow rate of water. In FIG. 5, the horizontal axis represents the gasifier load, and the vertical axis represents the opening degree of the bypass valve 162. Furthermore, in FIG. 6, the horizontal axis represents the gasifier load, and the vertical axis represents the flow velocity of water flowing through the hanger pipe 103.

When the gasifier load is smaller than the set load, the bypass valve 162 is closed, and hence flow rate (hanger flow rate) of water flowing through the hanger pipe 103 increases as the gasifier load rises. On the other hand, flow rate (bypass flow rate) of water flowing through the bypass pipe 161 is zero. Furthermore, because the flow rate (hanger flow rate) of water flowing through the hanger pipe 103 increases, the flow velocity (hanger flow velocity) of water flowing through the hanger pipe 103 increases as the gasifier load rises.

Then, when the gasifier load reaches the set load, the bypass valve 162 is opened and the water flows to the bypass pipe 161, and hence the hanger flow rate flowing through the hanger pipe 103 temporarily decreases. On the other hand, the bypass flow rate flowing through the bypass pipe 161 increases. Then, as the gasifier load rises to be larger than the set load, the hanger flow rate and the bypass flow rate increase more. Furthermore, as for the flow velocity of water flowing through the hanger pipe 103, the hanger flow velocity decreases when the bypass valve 162 is opened, but the hanger flow velocity increases as the gasifier load rises to be larger than the set load.

When the gasifier load rises to be larger than the set load, the flow velocity of the hanger pipe 103 approaches the upper limit flow velocity, and the flow-accelerated corrosion (FAC) tends to be accelerated and the pressure loss in the flow path in which water flows into the economizer 134 through the hanger pipe 103 tends to be increased. Thus, the opening degree of the bypass valve 162 is adjusted. In the case where the opening degree of the bypass valve 162 is set to a predetermined constant opening degree, the opening degree of the bypass valve 162 is set such that even when the gasifier load is 100%, the hanger flow rate and the bypass flow rate fall within a predetermined operation range that is the range of the upper limit flow rate and the lower limit flow rate set in advance. The upper limit flow rate is a flow rate at which the hanger flow rate becomes the upper limit flow velocity. Furthermore, the lower limit flow rate is a flow rate at which the temperature of water flowing through the hanger pipe 103 rises to a target monitoring temperature lower than a saturated temperature of the water. Then, as illustrated in FIG. 6, the hanger flow velocity is equal to or lower than the upper limit flow velocity in the entire range of the gasifier load.

In FIG. 7, the horizontal axis represents the gasifier load, and the vertical axis represents the fluid temperature of water. Furthermore, in FIG. 8, the horizontal axis represents the gasifier load, and the vertical axis represents a subcooled temperature.

When the gasifier load is smaller than the set load, the bypass valve 162 is closed, and hence as the gasifier load rises, the temperature of water flowing out from the hanger pipe 103 (hanger outlet temperature), the temperature of water flowing out from the economizer 134 (ECO outlet temperature), the temperature of water flowing through the feedwater pipe 157 (water supply temperature), and the saturated temperature of water gradually increase. On the other hand, as the gasifier load rises, the subcooled temperature in the outlet of the hanger pipe 103 (hanger outlet subcooled temperature) decreases because the rising width of the hanger outlet temperature is larger than the saturated vapor temperature. Similarly, as the gasifier load rises, the subcooled temperature in the outlet of the economizer 134 (ECO outlet subcooled temperature) decreases because the rising width of the ECO outlet temperature is larger than the saturated temperature.

Then, when the gasifier load reaches the set load, the bypass valve 162 is opened so that the bypass flow rate increases but the hanger flow rate decreases, and hence the hanger outlet temperature rises. Note that water flowing through the economizer inflow line 156 and water flowing through the bypass pipe 161 merge into the economizer 134, and hence there is no large change in the ECO outlet temperature. Furthermore, when the gasifier load reaches the set load, the hanger outlet temperature rises, and hence the hanger outlet subcooled temperature decreases.

As described above, when the gasifier load reaches the set load, the control device 105 executes the valve opening operation control for the bypass valve 162, and hence the flow velocity of water flowing through the hanger pipe 103 can be decreased, and the hanger outlet subcooled temperature can be set within the operation width although the temperature of the hanger pipe 103 slightly rises.

Next, when the valve opening operation control for setting the bypass valve 162 to a predetermined constant opening degree is executed, the control device 105 may temporarily execute control of the bypass valve 162 based on the first detected temperature of the first temperature detection sensor 171. Specifically, when the first detected temperature of the first temperature detection sensor 171 becomes equal to or higher than a target monitoring temperature set in advance, the control device 105 executes close operation control for temporarily operating the bypass valve 162 to the closed side. Here, the target monitoring temperature is a temperature lower than a steam generating temperature (saturated vapor temperature) at which water in the outlet header 155 becomes steam. Thus, when the opening degree of the bypass valve 162 is decreased, the flow rate of water flowing through the hanger pipe 103 is increased. Consequently, the temperature of water flowing out from the hanger pipe 103 can be decreased.

In addition, when the valve opening operation control for the bypass valve 162 is executed, the control device 105 executes control of the bypass valve 162 based on a second detected temperature of a second temperature detection sensor 172, which is the temperature of the economizer effluent line 158. Specifically, when the second detected temperature of the second temperature detection sensor 172 becomes equal to or higher than a target monitoring temperature set in advance, the control device 105 executes valve opening operation control such that the opening degree of the bypass valve 162 is temporarily increased to prevent an abrupt increase in pressure loss due to steam generation. Here, the target monitoring temperature is a temperature lower than a steam generating temperature (saturated vapor temperature) at which water flowing through the economizer effluent line 158 becomes steam. Thus, by increasing the opening degree of the bypass valve 162, the flow rate of water flowing through the bypass pipe 161 can be increased to decrease the temperature of water flowing out from the economizer 134.

Note that, when the first detected temperature and the second detected temperature become equal to or higher than a target monitoring temperature, the control device 105 may open the water supply valve 165 to increase the total amount of water supplied to the hanger pipe 103 and the bypass pipe 161.

As described above, according to the first embodiment, water supplied from the feedwater pipe 157 flows through the hanger pipe 103, then flows through the economizer inflow line 156, and flows into the economizer 134. Furthermore, when the bypass valve 162 is opened, the water supplied from the feedwater pipe 157 flows through the bypass pipe 161, and flows into the economizer 134. Thus, when the flow velocity of water in the hanger pipe 103 is high, the control device 105 can open the bypass valve 162 to cause water to flow into the bypass pipe 161, and hence can suppress flow-accelerated corrosion of the hanger pipe 103. Furthermore, because water is caused to flow through the bypass pipe 161, the length of a flow path in which water flows into the economizer 134 from the feedwater pipe 157 can be reduced, and hence a pressure loss in the flow path to the economizer 134 can be reduced. In addition, even when the bypass pipe 161 is closed, water can be caused to flow through the hanger pipe 103 and the economizer 134, and hence the overheating of the hanger pipe 103 and the economizer 134 can be suppressed.

Furthermore, according to the first embodiment, the total amount of water supplied from the feedwater pipe 157 is small until the gasifier load reaches a set load, and hence the control device 105 can cause the total amount of water from the feedwater pipe 157 to flow through the hanger pipe 103 while preventing the flow velocity of the hanger pipe 103 from reaching the upper limit flow velocity. Thus, the hanger pipe 103 and the economizer 134 can be appropriately cooled. Furthermore, the temperature of the hanger pipe 103 is prevented from excessively rising to cause strength reduction, and hence the heat exchanger 102 can be hung and supported safely.

Furthermore, according to the first embodiment, when the gasifier load becomes equal to or larger than a set load, the control device 105 opens the bypass valve 162 and allows a part of water supplied to the feedwater pipe 157 to flow to the bypass pipe 161. Thus, the increase in flow velocity in the hanger pipe 103 is prevented, and flow-accelerated corrosion can be suppressed. Besides, the pressure loss in the flow path to the economizer 134 can be reduced.

Furthermore, according to the first embodiment, when the valve opening operation of the bypass valve 162 is executed, the control device 105 can maintain the opening degree of the bypass valve 162 to a predetermined constant opening degree, and hence it is unnecessary to adjust the opening degree of the bypass valve 162. Consequently, water supply control can be simplified, and water can be caused to stably flow through the hanger pipe 103 and the bypass pipe 161.

Furthermore, according to the first embodiment, when the first detected temperature rises to reach a target monitoring temperature, the control device 105 decreases the opening degree of the bypass valve 162, and hence by increasing the amount of water flowing through the hanger pipe 103, the temperature of water supplied from the hanger pipe 103 to the outlet header 155 can be decreased. Consequently, the evaporation of water in the outlet header 155 can be suppressed, and hence water can be appropriately caused to flow from the outlet header 155 toward the economizer 134 through the economizer inflow line 156.

Furthermore, according to the first embodiment, when the valve opening operation control for the bypass valve 162 is executed, the control device 105 can adjust the opening degree of the bypass valve 162 based on the first detected temperature. In this case, the temperature of water can be set to be equal to or lower than a target monitoring temperature. Also in this case, the evaporation of water in the outlet header 155 can be suppressed, and hence water can be appropriately caused to flow from the outlet header 155 toward the economizer 134 through the economizer inflow line 156.

Furthermore, according to the first embodiment, when the second detected temperature rises to reach a target monitoring temperature, the control device 105 can increase the opening degree of the bypass valve 162, and hence the amount of water flowing through the bypass pipe 161 can be increased. Consequently, the temperature of water supplied from the bypass pipe 161 to the economizer 134 can be decreased, and hence the evaporation of water flowing out from the effluent port of the economizer 134 can be suppressed, and water can be appropriately caused to flow through the economizer 134.

Furthermore, according to the first embodiment, raw syngas produced by the highly reliable gasification apparatus 14 can be supplied to the gas turbine plant 17 so that the turbine 63 and the turbine 69 can be rotationally driven to generate power by the generator 19.

Second Embodiment

Next, a gasification apparatus 14 according to a second embodiment is described. In the second embodiment, differences from the first embodiment are described in order to avoid duplicated descriptions, and parts having the same configurations as those in the first embodiment are denoted by the same reference symbols.

In the first embodiment, the control device 105 closes the bypass valve 162 until the gasifier load reaches the set load, but in the second embodiment, the control device 105 sets the opening degree of the bypass valve 162 to the minimum opening degree until the gasifier load reaches the set load. The minimum opening degree of the bypass valve 162 is an opening degree that can prevent the fixation of the bypass valve 162, and is, for example, about 1 to 50%. Note that, when the gasifier load becomes equal to or larger than a set load, the control device 105 in the second embodiment executes the same control as in the first embodiment.

As described above, according to the second embodiment, until the gasifier load reaches a set load, a small amount of water supplied from the feedwater pipe 157 can be caused to flow through the bypass pipe 161, and the total remaining amount of water supplied from the feedwater pipe 157 can be caused to flow through the hanger pipe 103. Consequently, water can be caused to flow through the bypass pipe 103, and hence the bypass valve 162 is prevented from being fixed in the closed state, and water can be caused to appropriately flow through the hanger pipe 103 and the economizer 134.

Note that a tower gasifier has been described in the first embodiment and the second embodiment, but the embodiments can be similarly carried out even when the gasifier is a crossover gasifier.

REFERENCE SIGNS LIST 10 coal integrated gasification combined cycle (integrated gasification combined cycle)
11 stoker
11a coal feed line
14 gasification apparatus
15 char recovery unit
16 gas purifier
17 gas turbine plant
18 steam turbine plant
19 generator
20 heat recovery steam generator
41 compressed air supply line
42 air separation unit
43 first nitrogen supply line
45 second nitrogen supply line
46 char return line
47 oxygen supply line
49 gas production line
51 dust collector
52 supply hopper
53 gas discharge line
61 compressor
62 combustor
63 turbine
64 rotating shaft
65 compressed air supply line
66 fuel gas supply line
67 combustion gas supply line
68 booster
69 turbine
70 flue gas line
71 steam supply line
72 steam recovery line
74 gas purifying device
75 stack
101 gasifier
102 heat exchanger
103 hanger pipe
104 feedwater system
105 control device
110 pressure vessel
111 gasifier wall
115 annulus portion
116 combustor
117 diffuser
118 reductor
121 gas discharge outlet
122 slag bath
126 burner
127 burner
131 evaporator
132 superheater
134 economizer (heat exchanger)
141 heat transfer pipe
142 fin
151 steam drum
155 outlet header
156 economizer inflow line
157 feedwater pipe
158 economizer effluent line
159 steam pipe
160 water feed pipe
161 bypass pipe
162 bypass valve
165 feedwater valve
171 first temperature detection sensor
172 second temperature detection sensor

The invention claimed is:

1. A gasification apparatus for gasifying a carbonaceous feedstock to produce raw syngas, the gasification apparatus comprising:
   a gasifier in which the raw syngas flows;
   a heat exchanger provided inside the gasifier on a downstream side where the raw syngas flows to exchange heat with the raw syngas;
   a hanger pipe through which at least a part of water supplied from a water supply passage flows, the hanger pipe being configured to support a load of the heat exchanger;
   a heat exchanger inflow passage configured to cause the water flowing out from the hanger pipe to flow to an inflow side of the heat exchanger, the water flowing out from the hanger pipe being the at least a part of the water supplied from the water supply passage;
   a bypass passage branching from the water supply passage to cause a remaining of the water not supplied to the hanger pipe to bypass the hanger pipe and flow through the heat exchanger inflow passage;
   a bypass valve provided in the bypass passage, an opening degree of the bypass valve being adjusted such that an amount of the remaining water flowing through the bypass passage is adjusted; and
   a control device configured to control, depending on a gasifier load that is a load in the gasifier, the opening degree of the bypass valve to adjust an amount of the at least part of the water and the remaining water supplied to the hanger pipe and the bypass passage.

2. The gasification apparatus according to claim 1, wherein
   the control device is configured to close the bypass valve from when the carbonaceous feedstock is input into the gasifier at activation until when the gasifier load reaches a set load, and
   the set load is a load with which a flow velocity in the hanger pipe is equal to or lower than an upper limit flow velocity regulated by design.

3. The gasification apparatus according to claim 1, wherein
   the control device is configured to open the bypass valve with a minimum opening degree from when the carbonaceous feedstock is input into the gasifier at activation until when the gasifier load reaches a set load, and
   the set load is a load with which a flow velocity in the hanger pipe is equal to or lower than an upper limit flow velocity regulated by design.

4. An integrated gasification combined cycle, comprising:
   the gasification apparatus for gasifying a carbonaceous feedstock to produce raw syngas according to claim 1;
   a gas turbine configured to be rotationally driven by combusting at least a part of the raw syngas produced by the gasification apparatus;

a steam turbine configured to be rotationally driven by steam produced by a heat recovery steam generator into which turbine flue gas discharged from the gas turbine is introduced; and a generator coupled to the gas turbine and the steam turbine.

5. The gasification apparatus according to claim 1, wherein the control device executes valve opening operation control for operating the bypass valve to an open side when the gasifier load is equal to or larger than a set load, and the set load is a load with which a flow velocity in the hanger pipe is equal to or lower than an upper limit flow velocity regulated by design.

6. The gasification apparatus according to claim 5, wherein the control device sets the opening degree of the bypass valve to a predetermined constant opening degree when the valve opening operation control for the bypass valve is executed.

7. The gasification apparatus according to claim 5, further comprising:

an outlet header provided between the hanger pipe and the heat exchanger inflow passage; and a first temperature detector configured to detect a temperature of water in the outlet header, wherein the control device is configured to adjust, when the valve opening operation control for the bypass valve is executed, the opening degree of the bypass valve such that a first detected temperature detected by the first temperature detector becomes equal to or lower than a target monitoring temperature lower than a saturated vapor temperature at a pressure of the water in the outlet header.

8. The gasification apparatus according to claim 6, further comprising:

an outlet header provided between the hanger pipe and the heat exchanger inflow passage; and a first temperature detector configured to detect a temperature of water in the outlet header, wherein the control device is configured to execute, when a first detected temperature detected by the first temperature detector is equal to or higher than a target monitoring temperature lower than a saturated vapor temperature at a pressure of the water in the outlet header, valve closing operation control for operating the bypass valve to a closed side.

9. The gasification apparatus according to claim 6, further comprising a second temperature detector configured to detect a temperature of water flowing out from an effluent port of the heat exchanger, wherein the control device is configured to execute, when a second detected temperature detected by the second temperature detector reaches a target monitoring temperature lower than a saturated vapor temperature at a pressure of the water flowing out from the effluent port, the valve opening operation control for operating the bypass valve to the open side.

10. A control device for a gasification apparatus for gasifying a carbonaceous feedstock to produce raw syngas, the gasification apparatus comprising:

a gasifier in which the raw syngas flows;

a heat exchanger provided inside the gasifier on a downstream side where the raw syngas flows to exchange heat with the raw syngas;

a hanger pipe through which at least a part of water supplied from a water supply passage flows, the hanger pipe being configured to support a load of the heat exchanger;

a heat exchanger inflow passage configured to cause the water flowing out from the hanger pipe to flow to an inflow side of the heat exchanger, the water flowing out from the hanger pipe being the at least a part of the water supplied from the water supply passage;

a bypass passage branching from the water supply passage to cause a remaining of the water not supplied to the hanger pipe to bypass the hanger pipe and flow through the heat exchanger inflow passage; and a bypass valve provided in the bypass passage, an opening degree of the bypass valve being adjusted such that an amount of the remaining water flowing through the bypass passage is adjusted, wherein the control device is configured to control, depending on a gasifier load that is a load in the gasifier, the opening degree of the bypass valve to adjust an amount of the at least part of the water and the remaining water supplied to the hanger pipe and the bypass passage.

11. A control method for a gasification apparatus for gasifying a carbonaceous feedstock to produce raw syngas, the gasification apparatus including a gasifier in which the raw syngas flows, a heat exchanger provided inside the gasifier on a downstream side where the raw syngas flows to exchange heat with the raw syngas, a hanger pipe through which at least a part of water supplied from a water supply passage flows, the hanger pipe being configured to support a load of the heat exchanger, a heat exchanger inflow passage configured to cause the water flowing out from the hanger pipe to flow to an inflow side of the heat exchanger, the water flowing out from the hanger pipe being the at least a part of the water supplied from the water supply passage, a bypass passage branching from the water supply passage to cause a remaining of the water not supplied to the hanger pipe to bypass the hanger pipe and flow through the heat exchanger inflow passage, and a bypass valve provided in the bypass passage, an opening degree of the bypass valve being adjusted such that an amount of the remaining water flowing through the bypass passage is adjusted, the control method comprising controlling the opening degree of the bypass valve depending on a gasifier load that is a load in the gasifier, to adjust an amount of the at least part of the water and the remaining water supplied to the hanger pipe and the bypass passage.

* * * * *